Aug. 18, 1959     E. D. McKONE     2,900,113
CLEANSING CREAM DISPENSER
Filed June 15, 1956
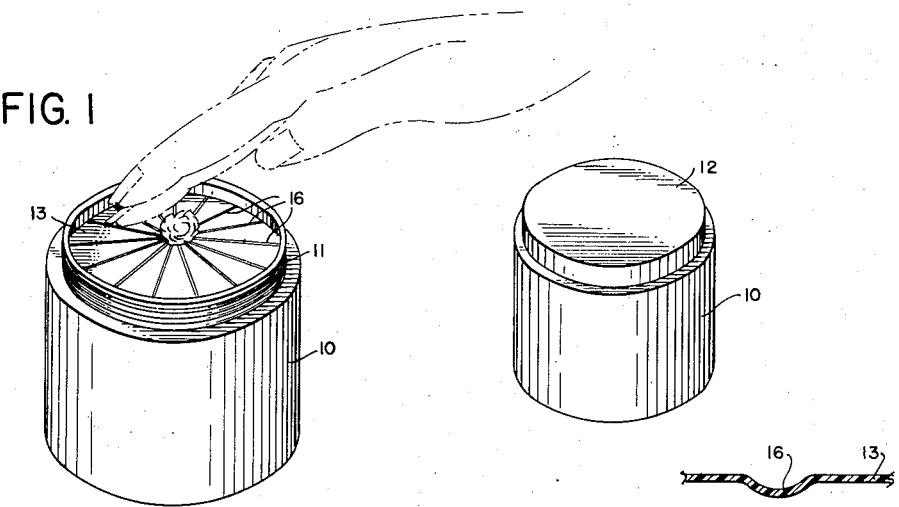
FIG. 1
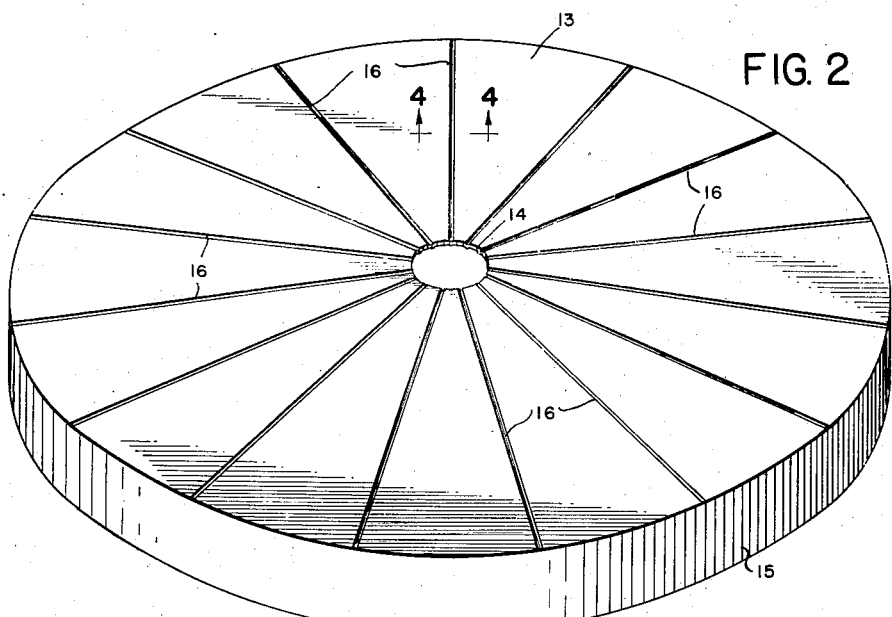
FIG. 4
FIG. 2
FIG. 3
INVENTOR
E. D. McKONE
BY A. Yates Dowell
ATTORNEY

United States Patent Office 2,900,113
Patented Aug. 18, 1959

2,900,113

CLEANSING CREAM DISPENSER

Elissa Daggs McKone, New York, N.Y.

Application June 15, 1956, Serial No. 591,737

2 Claims. (Cl. 222—215)

This invention relates to containers of various kinds for holding preparations to be dispensed and more particularly to containers for holding cosmetics or substances usually found on dressing tables, in powder rooms, and the like, and which preparations are employed in connection with the preparation of the toilet.

The invention is concerned with a device for use in connection with jars or containers for cosmetic preparations in moist creamy form, or other substances of like consistency, and to the dispensing of such preparations from said containers little by little with minimum effort and maximum convenience.

Toilet preparations of various kinds have been placed in jars or other cylindrical containers with lids threaded thereon and removable by slight unscrewing rotation. Sometimes these lids are difficult to remove and the contents are exposed and subject to contamination, being spilled, or otherwise extravagantly used or wasted.

It is an object of the invention to provide a simple and inexpensive dispenser for a cosmetic cream or moist plastic by which only a small portion of the contents of the container is exposed and a small quantity of the material is dispensed periodically through a small central discharge opening.

Another object of the invention is to provide a flexible dispensing diaphragm which may be applied to a conventional jar of cold cream or other substance of similar consistency to expose only a small portion of the contents of the container and which will facilitate efficiency and economy in dispensing as well as provide an attractive package.

Another object of the invention is to provide a cream dispenser in the form of a frusto-conical diaphragm for application upon the surface of the body of cosmetic cream or the like so that pressure upon the disk will produce discharge of the cream freely through the center of the diaphragm and at the same time, due to the flexibility of the diaphragm, the movement of the cream will be controlled prior to discharge.

Other objects and advantages of the invention will be apparent from the following description taken in conjunction with the accompanying drawing wherein:

Fig. 1 is a perspective illustrating one application of the invention and its use;

Fig. 2, a perspective of the dispenser itself;

Fig. 3, a vertical section of the dispenser; and

Fig. 4, an enlarged fragmentary horizontal section through one of the ribs of the dispenser diaphragm.

Briefly stated, a cylindrical container or receptacle has an open top and a cover and contains a mass of cosmetic preparation or the like cream adapted to be used a small amount at a time. In order to dispense a preparation from the container a frusto-conical disk is provided having a relatively short axis with a small dispensing opening at the top, and with a flange around its outer rim. This disk is placed in the top of the jar over the mass of cream in order to facilitate its application and use. This disk is made preferably of a flexible material such as transparent plastic, thus permitting the substance in the container to be viewed as it is used and at the same time the flexing of the disk facilitates the discharge from the jar. The disk likewise preferably is provided with radially disposed stiffening ribs.

With continued reference to the drawing, a cylindrical container or receptacle 10 may serve as a jar for cleansing cream, cold cream, or other substance, such jar having an externally threaded open end 11 and a cover 12, all of conventional construction.

In order to facilitate the dispensing of a creamy substance or preparation from the container, a disk 13 is provided, preferably of flexible transparent plastic, so that the contents to be viewed and the diameter of such disk preferably correspond to the internal diameter of the jar 10.

The disk is provided with a small central discharge opening 14 so that when it is placed in the jar upon the substance to be dispensed the opening 14 will expose only a portion of the preparation contained. The disk 13 is preferably frusto-conical with a peripheral flange 15 which reinforces the same and is of a size to fit snugly within the vertical inner wall of the jar 10.

The peripheral flange tapers to a thin outer edge and this flange will be pressed against the wall of the container by the preparation beneath the disk and within the container when pressure is applied to the top of the disk thereby providing a seal around the disk and against the adjacent wall of the container.

In addition to being flexible, the disk also is provided with radial reinforcing ribs 16 which serve to stiffen the disk although they allow flexing of the same. Thus by the addition of a flexible plastic frusto-conical disk with a small opening in its center to a jar of cold cream or other substance of like consistency and desired to be dispensed and used a small quantity at a time, a highly desirable result is obtained in that easy accessibility and removal of a small quantity of a substance is possible without excess discharge upon the fingers and soiling of the clothes or other needless waste. Further, on account of the flexing of the diaphragm positive discharge is insured at all times when pressure is applied to the diaphragm and the joint between the same and the jar will be sealed.

It will be obvious to those skilled in the art that various changes may be made in the invention without departing from the spirit and scope thereof, and therefore the invention is not limited by that which is illustrated in the drawing and described in the specification, but only as indicated in the accompanying claims.

What is claimed is:

1. A dispenser for a moist plastic on the order of a cosmetic cream comprising a container for matter to be dispensed, a removable cover for said container, a dispensing disk of frusto-conical configuration having a relatively short axis and a central discharge opening, said disk being formed of substantially transparent plastic and having a series of radial ribs and a marginal flange which tapers to a thin outer edge, said disk being adapted to be disposed within said container.

2. A dispenser for a moist plastic on the order of a cosmetic cream comprising a container for matter to be dispensed, a removable cover for said container, a dispensing disk of frusto-conical configuration having a relatively short axis and a central discharge opening, said disk being formed of substantially transparent plastic and having a series of radial strengthening ribs and a marginal flange which tapers to a thin outer edge.

(References on following page)

References Cited in the file of this patent

UNITED STATES PATENTS

| | | |
|---|---|---|
| 2,655,289 | Peal | Oct. 13, 1953 |
| 2,656,953 | Rich | Oct. 27, 1953 |
| 2,763,405 | Shvetz | Sept. 18, 1956 |

FOREIGN PATENTS

| | | |
|---|---|---|
| 394,945 | Great Britain | Sept. 28, 1931 |
| 1,683 of 1926 | Australia | May 31, 1926 |